US010627346B2

(12) United States Patent
Nagai (10) Patent No.: US 10,627,346 B2
(45) Date of Patent: Apr. 21, 2020

(54) REFRACTIVE INDEX MEASURING DEVICE AND REFRACTIVE INDEX MEASURING METHOD

(71) Applicant: SHIMADZU CORPORATION, Kyoto-shi, Kyoto (JP)

(72) Inventor: Tetsuya Nagai, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/114,252

(22) Filed: Aug. 28, 2018

(65) Prior Publication Data
US 2019/0094139 A1    Mar. 28, 2019

(30) Foreign Application Priority Data
Sep. 26, 2017    (JP) ................. 2017-185288

(51) Int. Cl.
*G01N 21/41*    (2006.01)
*G01J 1/42*    (2006.01)
(Continued)

(52) U.S. Cl.
CPC ........ *G01N 21/4133* (2013.01); *G01J 1/0477* (2013.01); *G01J 1/4257* (2013.01); *G01M 11/0228* (2013.01); *G01N 2021/4153* (2013.01)

(58) Field of Classification Search
None
See application file for complete search history.

(56) References Cited

U.S. PATENT DOCUMENTS 3,680,963 A * 8/1972 Edwards ................ G01N 21/45
356/517
4,735,504 A * 4/1988 Tycko ................ G01N 15/1459
356/336

(Continued)

FOREIGN PATENT DOCUMENTS

JP    2011-99795    *    5/2011
JP    2011099795 A    *    5/2011
WO   2014207809       12/2014

OTHER PUBLICATIONS

Malarde et al "High-resolution and compact refractometer for salinity measurements" Measurement Science and Technology 20, (2009).*

*Primary Examiner* — Kara E. Geisel
*Assistant Examiner* — Jarreas C Underwood
(74) *Attorney, Agent, or Firm* — JCIPRNET (57) ABSTRACT

Provided are a refractive index measuring device and a refractive index measuring method. A detector (2) detects an intensity of a measuring beam transmitted through the sample. A camera (200) images a color image of the measuring beam which is dispersed into multiple colors by transmitting through the sample. A scanning processing portion (101) carries out scanning by changing an angle of receiving the measuring beam transmitted through the sample or an angle of the measuring beam incident on the sample. A wavelength specifying processing portion (102) specifies, based on the detected intensity of the detector (2) varying with the scanning by the scanning processing portion (101) and color information corresponding to a position of the measuring beam incident on the detector (2) in a color image which is imaged by the camera (200), the wavelength corresponding to each peak of the detected intensity.

8 Claims, 6 Drawing Sheets

(51) Int. Cl.
   *G01J 1/04*     (2006.01)
   *G01M 11/02*    (2006.01)

(56) References Cited

U.S. PATENT DOCUMENTS

| | | | |
|---|---|---|---|
| 5,107,327 A * | 4/1992 | Nishimori | C08G 59/245 |
| | | | 257/793 |
| 8,692,985 B1 * | 4/2014 | Synowicki | G01N 21/43 |
| | | | 356/128 |
| 9,940,740 B2 | 4/2018 | Sawayanagi | |
| 2011/0194109 A1 * | 8/2011 | Kahre | G01N 21/43 |
| | | | 356/326 |
| 2012/0081698 A1 * | 4/2012 | Christian | G01N 21/43 |
| | | | 356/128 |
| 2014/0104601 A1 * | 4/2014 | Baba | G01N 21/43 |
| | | | 356/135 |
| 2016/0163077 A1 * | 6/2016 | Sawayanagi | G06T 11/206 |
| | | | 345/440.1 |
| 2016/0238525 A1 * | 8/2016 | Yamada | G01N 21/4133 |

* cited by examiner

REFRACTIVE INDEX MEASURING DEVICE AND REFRACTIVE INDEX MEASURING METHOD

CROSS-REFERENCE TO RELATED APPLICATION

This application claims the priority benefit of Japan Application no. 2017-185288, filed on Sep. 26, 2017. The entirety of the above-mentioned patent application is hereby incorporated by reference herein and made a part of this specification.

BACKGROUND

Technical Field

The disclosure relates to a refractive index measuring device which irradiates a sample kept in a V-shaped groove formed on a V-block prism with a measuring beam via the V-block prism, thereby detecting the measuring beam transmitted through the sample and measuring a refractive index of the sample, and a refractive index measuring method.

Description of Related Art

In a V-block refractive index measuring device which is a refractive index measuring device, a sample is disposed on a V-shaped groove formed on a V-block prism, and the sample is irradiated by a measuring beam via the V-block prism. Then, the measuring beam emitted from the V-block prism at an angle corresponding to the wavelength is scanned in a specific range and is detected by a detector, thereby measuring a refractive index of the sample according to the detection result (for example, see patent literature 1 below).

This type of refractive index measuring device is provided with multiple kinds of filters which are capable of being inserted in a light path of the measuring beam. Each of the multiple kinds of filters only transmits light with a different specific wavelength. By inserting one of the filter chosen from these filters in the light path of the measuring beam, only a measuring beam (monochromatic light) with a wavelength corresponding to the filter is irradiated to the sample.

LITERATURE OF PRIOR ART

Patent Literature

[Patent literature 1] International Publication No. 2014/207809

Problems to be Solved

In the abovementioned conventional V-block refractive index measuring device, the refractive index of the sample in each wavelength can be measured by changing the kind of the filter inserted in the light path of the measuring beam. However, in the case that the refractive index of the sample is measured in multiple wavelengths, the following problem occurs, that is, the kind of filter inserted in the light path of the measuring beam has to be changed to repeat the measurement in each wavelength, thus it is time-consuming to measure the refractive index.

SUMMARY

The disclosure is achieved in view of the situation, and provides a refractive index measuring device and a refractive index measuring method which are capable of shortening the measurement time during the measurement of the refractive index of a sample in multiple wavelengths.

Means to Solve the Problems

A refractive index measuring device according to the disclosure irradiates a measuring beam to a sample kept in a V-shaped groove formed on a V-block prism via the V-block prism, thereby detecting the measuring beam transmitted through the sample and measuring a refractive index of the sample, and is provided with a detector, an imaging part, a scanning processing portion, and a wavelength specifying processing portion. The detector detects an intensity of the measuring beam transmitted through the sample. The imaging part images a color image of the measuring beam which is dispersed to multiple colors by transmitting through the sample. The scanning processing portion performs scanning by changing an angle of receiving the measuring beam transmitted through the sample or an angle of the measuring beam incident on the sample. Based on the detected intensity of the detector varying with the scanning of the scanning processing portion, and color information corresponding to a position of the measuring beam incident on the detector in the color image that is imaged by the imaging part, the wavelength specifying processing portion specifies a wavelength corresponding to each peak of the detected intensity.

A refractive index measuring method according to the disclosure irradiates a measuring beam to a sample kept in a V-shaped groove formed on a V-block prism via the V-block prism, thereby detecting the measuring beam transmitted through the sample and measuring the refractive index of the sample, and a scanning step and a wavelength specifying step are included in the method. In the scanning step, scanning is carried out by changing an angle of receiving the measuring beam transmitted through the sample or an angle of the measuring beam incident on the sample, while an intensity of the measuring beam transmitted through the sample is detected by a detector, and a color image of the measuring beam which is dispersed to multiple colors by transmitting through the sample is imaged by an imaging part. In the wavelength specifying step, a wavelength corresponding to each peak of the detected intensity is specified based on a detected intensity of the detector varying with the scanning of the scanning step and on color information corresponding to a position of the measuring beam incident on the detector in the color image which is imaged by the imaging part.

DESCRIPTION OF THE EMBODIMENTS

An Overall Structure of a Refractive Index Measuring Device

Figure 1:
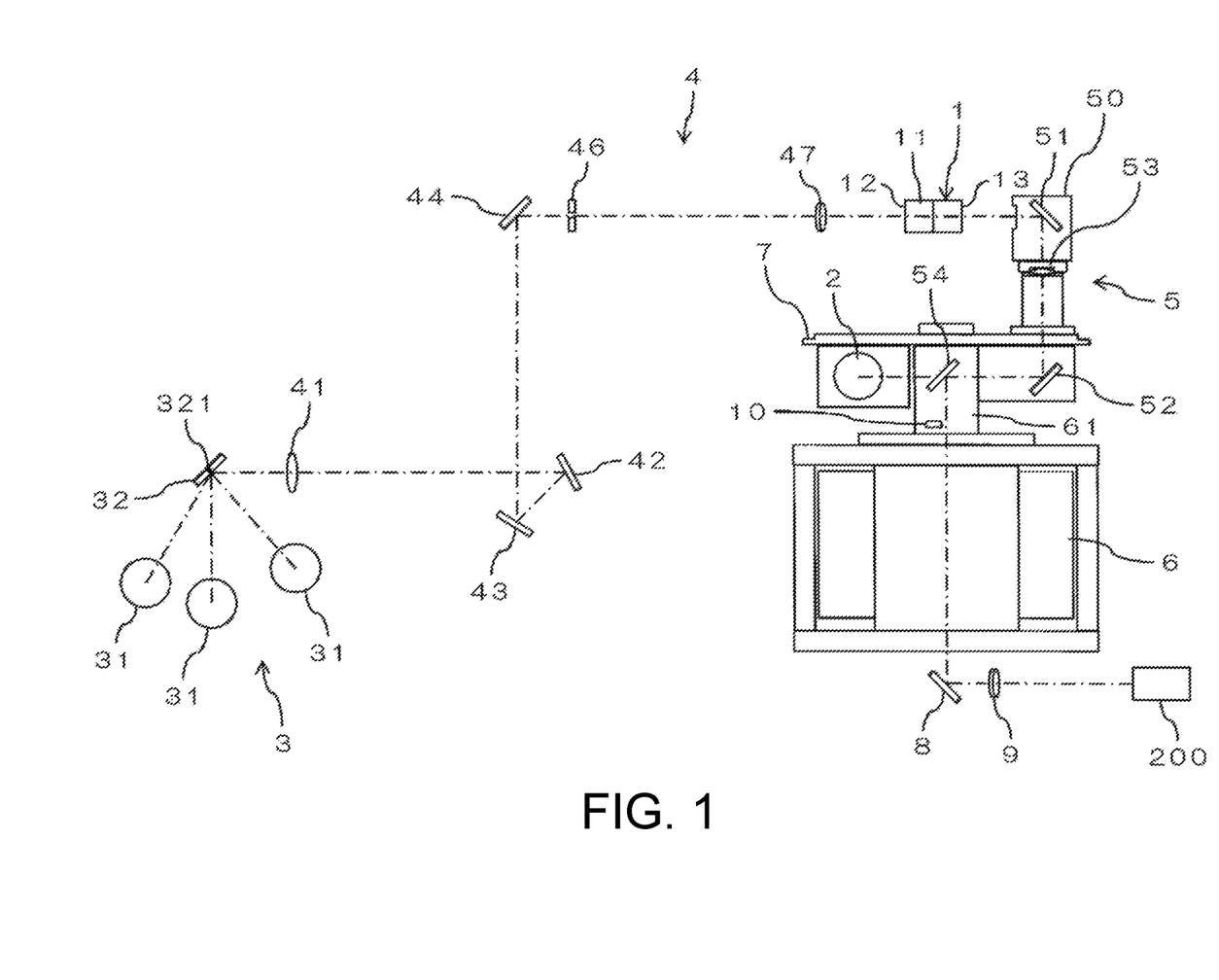
FIG. 1 is a schematic plan view illustrating a configuration example of a refractive index measuring device according to an embodiment of the disclosure.

FIG. 1 is a schematic plan view illustrating a configuration example of a refractive index measuring device according to an embodiment of the disclosure.

The refractive index measuring device is a V-block refractive index measuring device which measures a refractive index of a sample by irradiating a measuring beam to the sample via a V-block prism 1.

The sample may be, for example, glass, plastic or liquid and so on. The sample is disposed in a V-shaped groove 11 (FIG. 1 is a diagram illustrating the groove 11 from right above) formed on the V-block prism 1, the measuring beam transmitted through the sample is detected by a detector 2 and the refractive index of the sample can be measured according to a refraction angle and the refractive index of the V-block prism 1.

The refractive index measuring device is provided with, in addition to the V-block prism 1 and the detector 2, a light source part 3 which irradiates the measuring beam, a first optical system 4 which guides the measuring beam from the light source part 3 to the V-block prism 1, and a second optical system 5 which guides the measuring beam transmitted through the V-block prism 1 to the detector 2.

The light source part 3 is provided with a plurality of light sources 31. Helium lamp, hydrogen lamp and mercury lamp for example may be used as the light source 31, and the measuring beam with different wavelengths such as a helium d-ray, a hydrogen C-ray, a hydrogen F-ray, a mercury e-ray, a mercury g-ray and a mercury h-ray can be irradiated from the light source part 3. The measuring beam from the light source 31 is reflected by a mirror 32 and irradiated from the light source part 3 in a horizontal direction. The mirror 32 can rotate around a rotation axis 321 extending along a vertical direction (forward-backward direction in FIG. 1), and can guide the measuring beam originated from the light source 31 corresponding to a rotation position of the mirror 32 to the first optical system 4. However, the light source 31 is not limited to the types as mentioned above.

The first optical system 4 is provided with a lens 41, mirrors 42, 43, 44, a slit 46, a collimator lens 47 and the like. The measuring beam from the light source part 3 passes through the lens 41, reflects at the mirrors 42, 43, 44 in sequence and then passes through the slit 46. The measuring beam passing through the slit 46 enters the V-block prism 1 after being converted by the collimator lens 47 into parallel light. The measuring beam incident on the V-block prism 1 from an end surface 12 transmits through a sample disposed on the V-shaped groove 11, then passes through the V-block prism 1 again and is emitted from the other end surface 13.

The second optical system 5 is provided with mirrors 51, 52, a telemeter lens 53, a beam splitter 54 and the like. The second optical system 5 is fixed to a disk 7 attached to a rotation axis 61 of a motor 6. Specifically, the mirrors 51, 52 and the telemeter lens 53 are fixed to the disk 7 so as to be arranged in parallel to the rotation axis 61 at a position eccentric to the rotation axis 61, and the mirror 52 and the beam splitter 54 are fixed to the disk 7 so as to be arranged in a vertical direction with respect to the rotation axis 61.

The mirror 51 is disposed so that a reflection surface slopes 45° with respect to an incident direction of the measuring beam, by which the measuring beam reflected at the mirror 51 changes a progressing direction for 90° and is guided to the telemeter lens 53. The telemeter lens 53 focuses the measuring beam from the V-block prism 1 and guides the measuring beam to the mirror 52, and the measuring beam reflected at the mirror 52 transmits through the beam splitter 54 and is received by the detector 2 fixed to the disk 7. The detector 2 detects an intensity of the measuring beam transmitted through the sample by outputting a signal corresponding to an intensity of the received beam.

The mirror 51 and the telemeter lens 53 are disposed in a row in the vertical direction with respect to the incident direction of the measuring beam from the V-block prism 1, and is integrally kept on the disk 7 as a telemeter part 50 at a position eccentric to the rotation axis 61. Therefore, if the disk 7 is rotated around the rotation axis 61 by rotating the motor 6, the position of the telemeter part 50 with respect to the V-block prism 1 is changed (scanned), the measuring beam from the V-block prism 1 can be received from different angles and be guided to the detector 2. The motor 6 includes a sub-motor with an encoder for example and can accurately get the rotation angle of the motor 6.

On the other hand, the measuring beam reflected at the beam splitter 54 passes through the lens 9 after being reflected at the mirror 8 and is guided to a camera (imaging part) 200, and the measuring beam transmitted through the sample can be imaged by the camera 200. The beam splitter 54 and the mirror 8 are arranged on the rotation axis 61, and when the position of the V-block prism 1 is adjusted, an auto-collimation prism 10 can be inserted in the light path between the beam splitter 54 and the mirror 8.

The camera 200 can be formed by, for example, a color camera having a Charge Coupled Device (CCD). The camera 200 is not limited to the structure arranged on the position as mentioned above, and may be, for example, such a structure that the measuring beam is guided to the camera 200 via a beam splitter which is attached to the disk 7 and is arranged separated from the beam splitter 54.

In the embodiment, no filter is arranged in the light path of the measuring beam, thus the measuring beam from the light source part 3 rather than monochromatic light is incident directly on the sample. Then, the measuring beam is incident on the camera 200 after being dispersed into multiple colors by transmitting through the sample. The imaging range of the camera 200 is set to a range in which the dispersed measuring beams with multiple colors can be imaged simultaneously. Therefore, in the color image (a still image or a dynamic image) of the measuring beam imaged by the camera 200, images of multiple colors are displayed in a line.

2. Structure of the V-Block Prism

Figure 2:
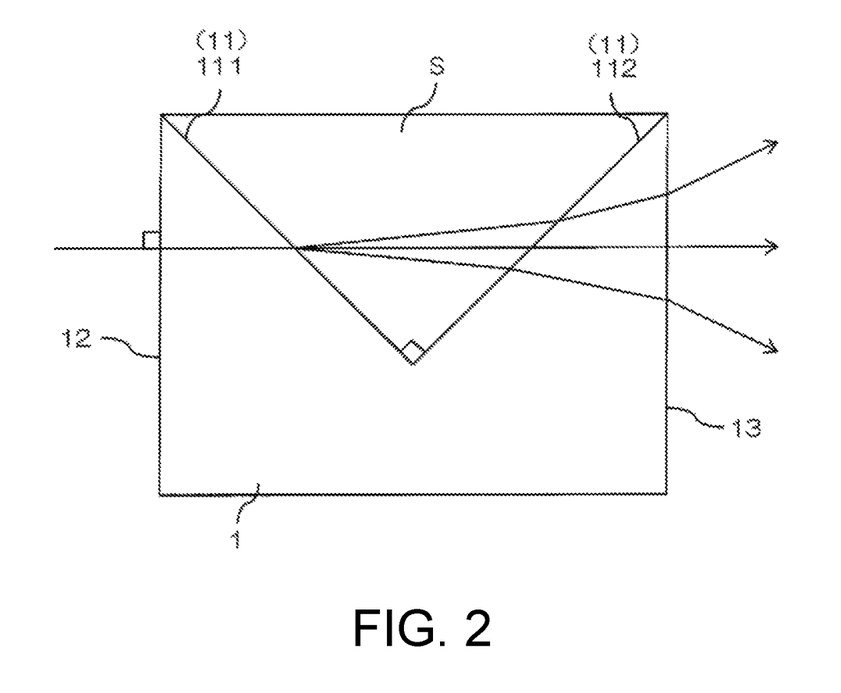
FIG. 2 is a schematic side view illustrating a configuration example of a V-block prism.

FIG. 2 is a schematic side view illustrating a configuration example of the V-block prism 1. As shown in FIG. 2, the V-block prism 1 is provided with the V-shaped groove 11 formed by a pair of plane surfaces 111, 112 at right angles to each other. The surface of a sample S is formed to a V shape corresponding to the groove 11, and is kept at a state of being disposed on the groove 11.

The measuring beam is incident perpendicularly on one end surface 12 of the V-block prism 1. The measuring beam incident from the end surface 12 passes through the V-block prism 1 and is incident on the sample S from the plane surface 111 of the groove 11. At this point, as shown in FIG. 2, the measuring beam refracts at an angle corresponding to the refractive index of the sample S and transmits through the sample S, then refracts again on the plane surface 112 of the groove 11 and is incident on into the V-block prism 1 again. Then, the measuring beam passes through the V-block prism 1 and refracts again when being emitted from the end surface 13.

In this way, the measuring beam is irradiated to the sample S via the V-block prism 1, and the measuring beam transmitted through the sample S is emitted from the other end surface 13 at an angle corresponding to a refractive index difference between the V-block prism 1 and the sample S. Therefore, by detecting the measuring beam emitted from the V-block prism 1, the refractive index of the sample S can be measured based on the emitting angle of the measuring beam.

3. Electrical Structure of the Refractive Index Measuring Device

Figure 3:
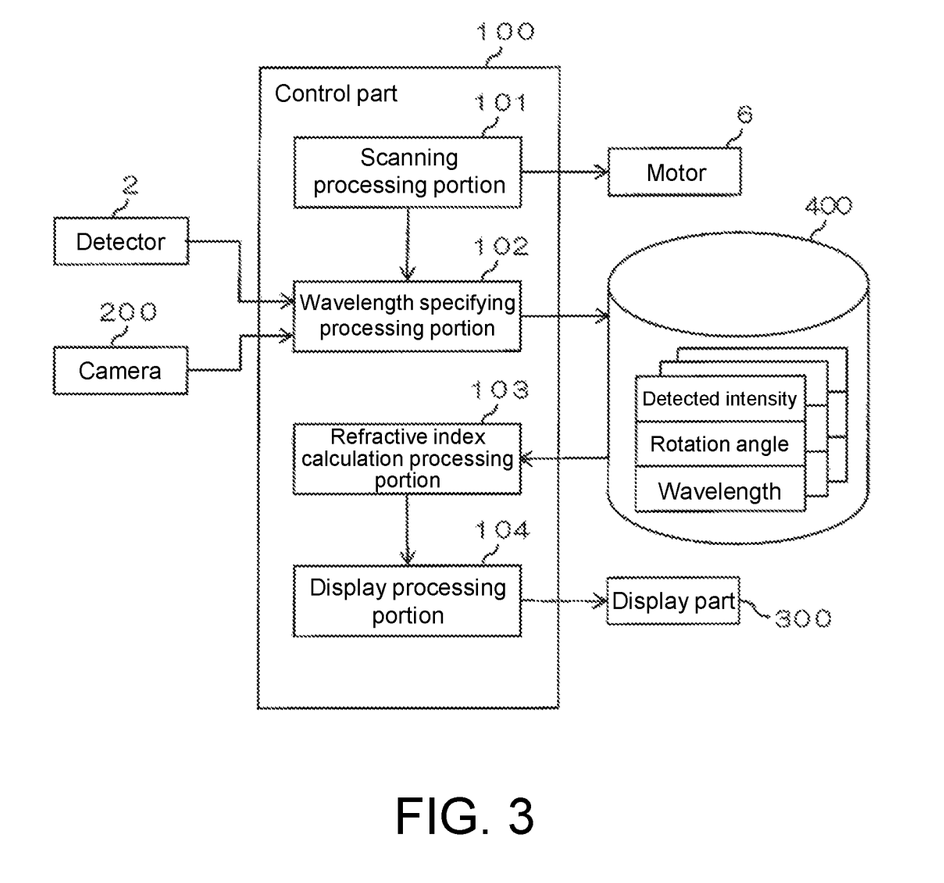
FIG. 3 is a block diagram illustrating a configuration example of a control part in the refractive index measuring device in FIG. 1.

FIG. 3 is a block diagram illustrating a configuration example of a control part 100 in the refractive index measuring device of FIG. 1. The operation of the refractive index measuring device is controlled by the control part 100 containing, for example, a Central Processing Unit (CPU). The control part 100 functions as a scanning processing portion 101, a wavelength specifying processing portion 102, a refractive index calculation processing portion 103, a display processing portion 104 and so on by the CPU implementing a program.

By rotating the motor 6, the scanning processing portion 101 makes the telemeter part 50 scan the V-block prism 1 (scanning step). When the refractive index of the sample is measured, the scanning processing portion 101 rotates the motor 6 at a specific speed, thereby changing the angle of receiving the measuring beam transmitted through the sample to carry out scanning. As a result, the light quantity of the measuring beam guided from the V-block prism 1 to the detector 2 changes, thus the detected intensity in the detector 2 changes along with the rotation of the motor 6.

The wavelength specifying processing portion 102 carries out a process specifying a wavelength corresponding to each peak of the detected intensity based on the detected intensity in the detector 2 and the color image that is imaged by the camera 200 (wavelength specifying step). In the embodiment, no filter is arranged in the light path of the measuring beam, the measuring beam from the light source part 3 rather than monochromatic light is directly incident on the sample, and the light at each wavelength refracts at the sample and is detected by the detector 2. Therefore, multiple peaks emerge in the detection signal from the detector 2. The wavelength specifying processing portion 102 specifies, based on the detected intensity of the detector 2 varying with the scanning by the scanning processing portion 101 and the color information (for example, RGB data) corresponding to the position of the measuring beam incident into the detector 2 in the color image that is imaged by the camera 200, the wavelength corresponding to each peak of the detected intensity.

The refractive index measuring device is provided with a storage part 400 formed by, for example, a hard disk or a Random Access Memory (RAM). The relation of each peak of the detected intensity and the wavelength specified by the wavelength specifying processing portion 102 is associated with each other and stored in the storage part 400 (storing step). At this point, the rotation angle of the motor 6 when each peak is detected is also associated with the detected intensity and the wavelength and stored in the storage part 400.

The refractive index calculation processing portion 103 calculates, based on the relation of each peak of the detected intensity and the wavelength stored in the storage part 400, the refractive index of the sample at the wavelength corresponding to each peak of the detected intensity (refractive index calculating step). That is, because the wavelength corresponding to each peak of the detected intensity is specified by the wavelength specifying processing portion 102, and each wavelength is associated with the rotation angle of the motor 6 and stored in the storage part 400, the refractive index of the sample at each wavelength can be calculated based on the rotation angle of the motor 6 at each wavelength and the refractive index of the V-block prism 1.

The display processing portion 104 performs a process related to the display on a display screen of the display part 300. The display part 300 contains, for example, a liquid crystal display, and may be provided with a refractive index measuring device, or be arranged separate from the refractive index measuring device. The display processing portion 104 can display various information on the display screen of the display part 300, such as the refractive index of the sample at a wavelength corresponding to each peak of the detected intensity, which is calculated by the refractive index calculation processing portion 103.

4. Specifying of Wavelength Based on a Color Image

Figure 4:
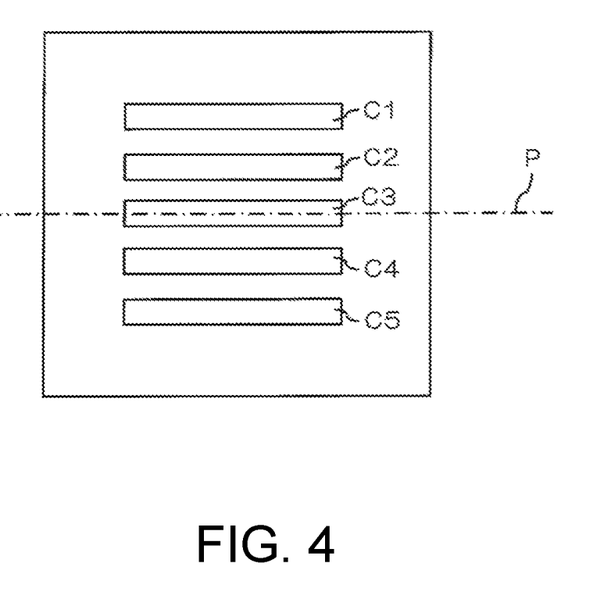
FIG. 4 is a diagram schematically illustrating a specific example of a color image that is imaged by a camera.
Figure 5:
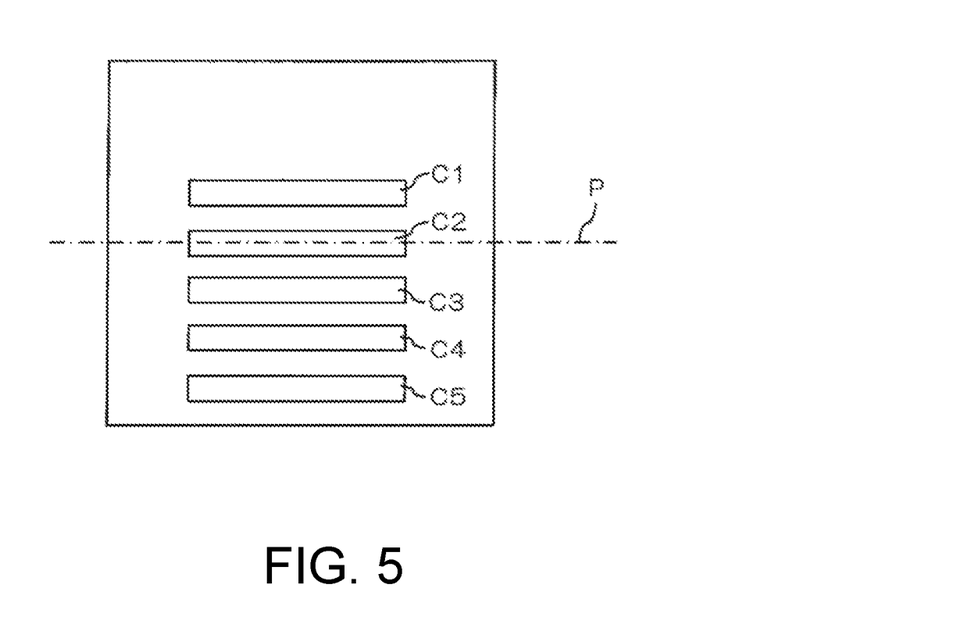
FIG. 5 is a diagram schematically illustrating a specific example of a color image that is imaged by a camera.
Figure 6:
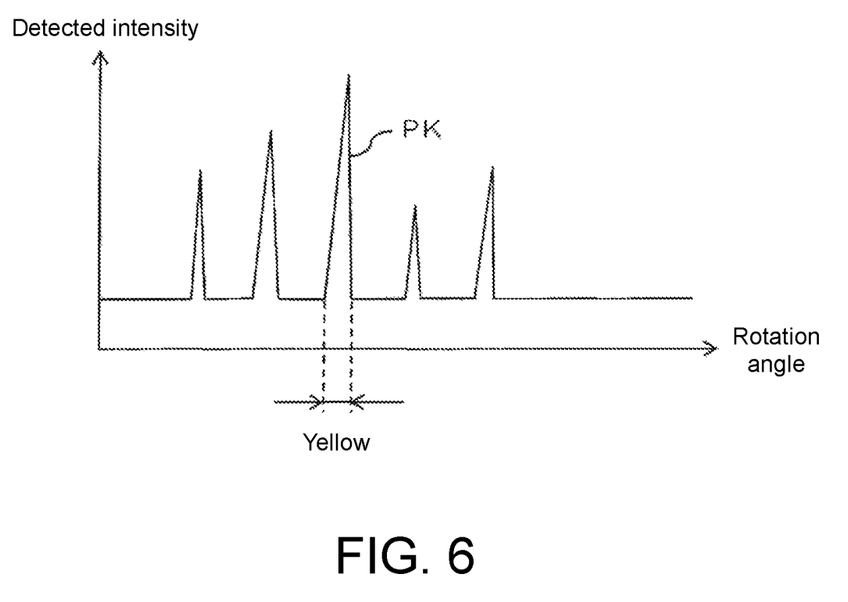
FIG. 6 is a diagram schematically illustrating an example of a change in a detected intensity of a detector along with a scanning of a scanning processing portion, representing a relation of a rotation angle of a motor and the detected intensity of the detector.

FIG. 4 and FIG. 5 are diagrams schematically illustrating a specific example of a color image that is imaged by the camera 200. FIG. 6 is a diagram schematically illustrating an example of the change in the detected intensity of the detector 2 along with the scanning of the scanning processing portion 101, and represents a relation of the rotation angle of the motor 6 and the detected intensity of the detector 2.

The measuring beam is dispersed into multiple colors by transmitting through the sample, thus in the color image of the measuring beam which is imaged by the camera 200, images C1, C2, C3, C4, and C5 with multiple colors are displayed in a line as shown in FIG. 4 and FIG. 5. In the example, the measuring beam passes through the slit 46, thus images C1, C2, C3, C4, and C5 with different colors become a long and thin shape like a bar. The colors of images C1, C2, C3, C4, and C5 are, for example, purple, blue, yellow, red, orange and so on.

In the case that a scanning is carried out by the scanning processing portion 101, each of the images C1, C2, C3, C4, and C5 in the color image moves along a scanning direction. In the example, as shown in FIG. 4 and FIG. 5, each of the images C1, C2, C3, C4, and C5 moves in parallel in the vertical direction along with the scanning of the scanning processing portion 101. Therefore, in a region of the color image corresponding to the position (measuring position P) of the measuring beam incident into the detector 2, the images C1, C2, C3, C4, and C5 varying with the scanning are located. In the example, the image C3 is located in the region of the color image corresponding to the measuring position P in FIG. 4, and the image C2 is located there in FIG. 5.

Therefore, based on the color information of the image corresponding to the measuring position P, a peak of the detected intensity of the detector 2 at that moment can be specified as the peak of the measuring beam at the wavelength corresponding to the color information. For example, as shown in FIG. 4, the yellow image C3 is located in the region of the color image corresponding to the measuring position P, and in the case that a peak PK shown in FIG. 6 is detected at this moment, the peak PK can be specified as the peak corresponding to the wavelength of yellow.

In this way, based on the corresponding relation of the color information of each of the images C1, C2, C3, C4, and C5 located on the measuring position P in sequence with the scanning and the peak of the detected intensity, the wavelength corresponding to each peak can be specified. The specified wavelength may be a wavelength range corresponding to the color information of each of the images C1, C2, C3, C4, and C5, or a specific wavelength (for example, a middle wavelength) in the range.

5. Effects (1) In the embodiment, the wavelength of the measuring beam incident into the detector 2 can be specified based on the color information of the color image which is imaged by the camera 200. As a result, the wavelength of the measuring beam incident into the detector 2 can be associated with the peak of the detected intensity when the measuring beam of this wavelength is incident on the detector 2. Therefore, when the refractive index of the sample is measured at multiple wavelengths, for the multiple peaks of the detected intensity obtained in one scanning (see FIG. 6), the wavelength corresponding to each peak can be specified. If the relation of each peak of the detected intensity and the wavelength specified in this way is used, the refractive index of the sample can be measured at multiple wavelengths in one scanning, thus the measurement time can be shortened. In addition, any color image may be used as long as color distribution information on the imaged plane surface can be obtained from the color image.

(2) Besides, in the embodiment, for the multiple peaks of the detected intensity obtained in one scanning, the wavelength corresponding to each peak can be specified, and the relation of the wavelength and each peak can be associated with each other and stored in the storage part 400. Therefore, if the corresponding relation stored in the storage part 400 is read out to carry out an arithmetic operation, the refractive index of the sample can be measured at multiple wavelengths based on the data obtained in one scanning.

(3) Furthermore, in the Embodiment, for the Multiple Peaks of the Detected intensity obtained in one scanning, the wavelength corresponding to each peak is specified, and the arithmetic operation based on the relation of the wavelength and each peak is carried out by the refractive index calculation processing portion 103, thereby the refractive index of the sample can be automatically measured at multiple wavelengths. Therefore, the refractive index of the sample can be easily measured at multiple wavelengths in a short time.

6. Variation

The scanning processing portion 101 is not limited to such a structure which carries out the scanning by changing the angle of receiving the measuring beam emitted from the sample, and may be such a structure which carries out the scanning by changing the angle of the measuring beam incident on the sample. In this case, the scanning processing portion 101 may be such a structure which, for example, can fix a collimator part (not shown) that keeps a collimator lens to a disk and rotates the disk by a motor, thereby changing an angle of the collimator with respect to the V-block prism 1 to carry out the scanning.

The relation of each peak of the detected intensity and the wavelength specified by the wavelength specifying processing portion 102 may not be stored in the storage part 400. That is, the refractive index calculation processing portion 103 may be such a structure which calculates in real-time, based on the relation of each peak of the detected intensity and the wavelength specified by the wavelength specifying processing portion 102, the refractive index of the sample at the wavelength corresponding to each peak of the detected intensity.

In the abovementioned embodiment, such a structure is described in which the scanning step, the wavelength specifying step, the storing step and the refractive index calculating step are all automatically carried out by the refractive index measuring device. However, the disclosure is not limited to such a structure, and at least one of the abovementioned steps may be carried out manually by an operator.

According to such a structure, the wavelength of the measuring beam incident on the detector can be specified based on the color information of the color image that is imaged by the imaging part. Accordingly, the wavelength of the measuring beam incident on the detector can be associated with the peak of the detected intensity when the measuring beam of this wavelength is incident on the detector. Therefore, when the refractive index of the sample is measured in multiple wavelengths, for multiple peaks of the detected intensity obtained in one scanning, the wavelength corresponding to each peak can be specified. Using the relation of each peak of the detected intensity and the wavelength specified in this manner, the refractive index of the sample can be measured in multiple wavelengths by one scanning, thus the measurement time can be shortened.

The refractive index measuring device may further include a storage part. The storage part associates and stores a relation of each peak of the detected intensity and the wavelength specified by the wavelength specifying processing portion to each other and stores the relation.

According to such a structure, for multiple peaks of the detected intensity obtained in one scanning, it is possible to specify the wavelength corresponding to each peak, associate the relation of the wavelength and each peak with each other and store the relation in the storage part. Therefore, if the corresponding relation stored in the storage part is read out to carry out arithmetic operation, the refractive index of the sample can be measured at multiple wavelengths based on the data obtained in one scanning.

The refractive index measuring device may further include a refractive index calculation processing portion. The refractive index calculation processing portion calculates, based on the relation of each peak of the detected intensity and the wavelength specified by the wavelength specifying processing portion, the refractive index of the sample at the wavelength corresponding to each peak of the detected intensity.

According to such a structure, for multiple peaks of the detected intensity obtained in one scanning, the refractive index of the sample can be automatically measured at multiple wavelengths by specifying the wavelength corresponding to each peak and carrying out an arithmetic operation which is based on the relation of the wavelength and each peak by the refractive index calculation processing portion. Therefore, the refractive index of the sample can be easily measured at multiple wavelengths in a short time.

The refractive index measuring method may further include a storing step. In the storing step, the relation of each peak of the detected intensity and the wavelength specified by the wavelength specifying step is associated with each other and stored in a storage part.

The refractive index measuring method may further include a refractive index calculating step. In the refractive index calculating step, the refractive index of the sample at the wavelength corresponding to each peak of the detected intensity is calculated based on the relation of each peak of the detected intensity and the wavelength specified by the wavelength specifying step.

According to the disclosure, the refractive index of the sample can be measured at multiple wavelengths in one scanning, thus the measurement time can be shortened.

What is claimed is:

1. A refractive index measuring device, which irradiates a measuring beam that is dispersed into multiple colors to a sample kept in a V-shaped groove formed on a V-block prism via the V-block prism, thereby detecting the measuring beam transmitted through the sample and measuring a refractive index of the sample in multiple wavelengths, comprising:
a detector, which detects an intensity of the measuring beam transmitted through the sample;
an image capturing device, which images a color image of the measuring beam that is dispersed to multiple colors by transmitting through the sample, wherein an imaging range of the image capturing device is set to a range in which the dispersed measuring beams with multiple colors are imaged simultaneously; and
a processor;
wherein the processor is configured to function as:
a scanning processing portion, which performs scanning by changing an angle of receiving the measuring beam transmitted through the sample, wherein a detected intensity of the detector changes along with the changing of the angle of receiving the measuring beam transmitted through the sample or the angle of the measuring beam incident on the sample; and
a wavelength specifying processing portion, wherein based on the detected intensity of the detector varying with the scanning of the scanning processing portion and a color information corresponding to a position of the measuring beam incident on the detector in the color image that includes the dispersed measuring beams with multiple colors and is imaged by the image capturing device, the wavelength specifying processing portion specifies a wavelength corresponding to each peak of the detected intensity.

2. The refractive index measuring device according to claim 1, further comprising a storage part which associates and stores a relation of each peak of the detected intensity and the wavelength specified by the wavelength specifying processing portion.

3. The refractive index measuring device according to claim 2, wherein the processor is configured to function as a refractive index calculation processing portion which calculates, based on the relation of each peak of the detected intensity and the wavelength specified by the wavelength specifying processing portion, the refractive index of the sample at the wavelength corresponding to each peak of the detected intensity.

4. The refractive index measuring device according to claim 1, wherein the processor is configured to function as a refractive index calculation processing portion which calculates, based on the relation of each peak of the detected intensity and the wavelength specified by the wavelength specifying processing portion, the refractive index of the sample at the wavelength corresponding to each peak of the detected intensity.

5. A refractive index measuring method, which irradiates a measuring beam that is dispersed into multiple colors to a sample kept in a V-shaped groove formed on a V-block prism via the V-block prism, thereby detecting the measuring beam transmitted through the sample and measuring a refractive index of the sample in multiple wavelengths, comprising:
a scanning step, in which scanning is carried out by changing an angle of receiving the measuring beam transmitted through the sample or an angle of the measuring beam incident on the sample, wherein a detected intensity of a detector changes along with the changing of the angle of receiving the measuring beam transmitted through the sample, while an intensity of the measuring beam transmitted through the sample is detected by a detector, and a color image of the measuring beam which is dispersed to multiple colors by transmitting through the sample is imaged by an image capturing device, wherein an imaging range of the image capturing device is set to a range in which the dispersed measuring beams with multiple colors are imaged simultaneously; and
a wavelength specifying step, in which based on the detected intensity of the detector varying with the scanning of the scanning step and on a color information corresponding to a position of the measuring beam incident on the detector in the color image that includes the dispersed measuring beams with multiple colors and is imaged by the image capturing device, a wavelength corresponding to each peak of the detected intensity is specified.

6. The refractive index measuring method according to claim 5, further comprising a storing step in which a relation of each peak of the detected intensity and the wavelength specified by the wavelength specifying step is associated with each other and stored in a storage part.

7. The refractive index measuring method according to claim 6, further comprising a refractive index calculating step in which the refractive index of the sample at the wavelength corresponding to each peak of the detected intensity is calculated based on the relation of each peak of the detected intensity and the wavelength specified by the wavelength specifying step.

8. The refractive index measuring method according to claim 5, further comprising a refractive index calculating step in which the refractive index of the sample at the wavelength corresponding to each peak of the detected intensity is calculated based on the relation of each peak of the detected intensity and the wavelength specified by the wavelength specifying step.

* * * * *